US010212003B2

(12) United States Patent
Traeber (10) Patent No.: US 10,212,003 B2
(45) Date of Patent: Feb. 19, 2019

(54) MULTI-MODE ETHERNET TRANSCEIVER (75) Inventor: Mario Traeber, Pliening (DE)

(73) Assignee: Lantiq Beteiligungs-GmbH & Co. KG, Neubiberg (DE)

(*) Notice: Subject to any disclaimer, the term of this patent is extended or adjusted under 35 U.S.C. 154(b) by 1067 days.

(21) Appl. No.: 12/143,084

(22) Filed: Jun. 20, 2008

(65) Prior Publication Data

US 2009/0316722 A1    Dec. 24, 2009

(51) Int. Cl.
*H04L 12/40*    (2006.01)
*H04L 12/701*    (2013.01)
*H04L 12/707*    (2013.01)
*H04L 12/801*    (2013.01)
*H04L 12/825*    (2013.01)
*H04L 12/891*    (2013.01)

(52) U.S. Cl.
CPC ........ *H04L 12/40136* (2013.01); *H04L 45/00* (2013.01); *H04L 45/24* (2013.01); *H04L 47/10* (2013.01); *H04L 47/13* (2013.01); *H04L 47/25* (2013.01); *H04L 47/41* (2013.01); *Y02D 50/30* (2018.01)

(58) Field of Classification Search
CPC ... H04L 12/40136; H04L 45/00; H04L 45/24; H04L 47/10; H04L 47/13; H04L 47/25; H04L 47/41; Y02B 60/33
USPC ........................................................ 370/468
See application file for complete search history.

(56) References Cited

U.S. PATENT DOCUMENTS

| | | | | |
|---|---|---|---|---|
| 7,624,197 | B1* | 11/2009 | Lo .................................. | 709/250 |
| 2002/0039354 | A1* | 4/2002 | Chen et al. ................... | 370/296 |
| 2002/0051395 | A1* | 5/2002 | Hatamian ...................... | 365/222 |
| 2003/0101302 | A1* | 5/2003 | Brocco et al. ................ | 710/300 |
| 2006/0109784 | A1* | 5/2006 | Weller et al. ................. | 370/229 |
| 2008/0187028 | A1* | 8/2008 | Lida .............................. | 375/140 |

OTHER PUBLICATIONS

Balachandran 2005 "Online Guide to Ethernet".*
"VSC7388, SparX-G8—8-port Integrated Gigabit Ethernet Switch SoC with Copper PHYs," Vitesse, www.vitesse.com, 1 page.
"ET2005-40, Gigabit Ethernet Five-Port Switch and PHY," Agere Systems, Product Brief, Feb. 2006, pp. 1-4.
"BCM5400 100/1000Base-T Gigabit Ethernet Transceiver," BCM5400 Product Brief, Broadcom, www.broadcom.com, 2 pages.
"Gigabit Ethernet over Copper," CSD Magazine, Aug. 1998, http://www.commsdesign.com/main/9808fe1,htm, 7 pages.

(Continued)

*Primary Examiner* — Stephen J Clawson
(74) *Attorney, Agent, or Firm* — Eschweiler & Potashnik, LLC (57) ABSTRACT

According to one embodiment, an Ethernet communication device is configured to be connected to one or more twisted-pair links, each twisted-pair link having a particular capacity. The Ethernet communication device includes a physical interface transceiver. The physical interface transceiver sets a data transmission rate of the Ethernet communication device based on a total capacity of the twisted-pair links connected to the Ethernet communication device. The physical interface transceiver transmits data over the twisted-pair links connected to the Ethernet communication device at the data transmission rate.

10 Claims, 5 Drawing Sheets

(56) References Cited

OTHER PUBLICATIONS

"Marvell Alaska 88EIII, Single Port Gigabit Ethernet Transceiver," Marvell Semiconductor, Inc., www.marvell.com, 2 pages.
"Ethernet IP, Serial Gigabit Media Independent Interface, M-SGMII," Mentor Graphics, www.mentor.com/ip, 2 pages.
"Gigabit Ethernet PHY Chip Sets LAN Speed Record for CopperStory", Electronic Design, Nov. 16, 1998, http://electronicdesign.com/Globals/Planet EE/Content/2706.htm, 6 pages.

* cited by examiner

MULTI-MODE ETHERNET TRANSCEIVER

BACKGROUND

Some types of Ethernet transceivers, for example gigabit Ethernet transceivers are configured to transmit data over copper cabling. Take, for example, 1000BASE-T Ethernet transceivers. Conventional 1000BASE-T Ethernet transceivers include a PHY (physical interface transceiver) having four transmit and receive sections for implementing full-duplex physical layer signaling. Gigabit Ethernet speed can be achieved by connecting the PHY to a Category-5 (CAT-5) type copper cable or higher having four different twisted-pair links. The transmit/receive sections of the PHY are coupled to different ones of the twisted-pair links. Each twisted-pair link has an individual capacity of approximately 250 Mbps (Mega bits per second) for cable lengths of about 100 m or less. Thus, a total link capacity of approximately 1000 Mbps is available when all four links are employed.

During operation, eight bits of data are transmitted each transmission window over the four twisted-pair links using a 125 MHz symbol rate. The twisted-pair links employ a five-point, 1-dimensional (1D) constellation having five symbol values (−2, −1, 0, +1, +2) encoded using three bits. The four twisted-pair links collectively form a 4-dimensional (4D) constellation where each twisted-pair link represents one of the dimensions. Thus, a 4D symbol is transmitted at gigabit Ethernet speeds by encoding eight bits of data into four symbols and transmitting each of the four symbols over a different one of the twisted-pair links in parallel.

Gigabit Ethernet transceivers are not always connected to cabling having gigabit transmission bandwidth. For example, Cateogry-3 (CAT-3) or other comparable 2-pair type of cabling cannot support gigabit Ethernet speeds. Conventional Ethernet PHYs have an auto-negotiation feature for detecting the type of cabling and configuring the PHYs accordingly. Typically, the data transmission rate of a gigabit Ethernet PHY is reduced from 1000 Mbps (1000BASE-T) to 100 Mbps (100BASE-TX) or 10 Mbps (10BASE-TX) when sub-gigabit capacity cabling is connected to the PHY. However, each twisted-pair link connected to the PHY still has a capacity of approximately 250 Mbps at cable lengths of about 100 m or less. Transceiver performance is not optimized when the PHY operates at 100 Mbps or 10 Mbps even though each twisted-pair link has a much greater capacity.

SUMMARY

According to the methods and apparatus taught herein, an Ethernet communication device is configured to be connected to one or more twisted-pair links, each twisted-pair link having a particular capacity. The Ethernet communication device includes a physical interface transceiver. The physical interface transceiver sets a data transmission rate of the Ethernet communication device based on a total capacity of the twisted-pair links connected to the Ethernet communication device. The physical interface transceiver transmits data over the twisted-pair links connected to the Ethernet communication device at the data transmission rate.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
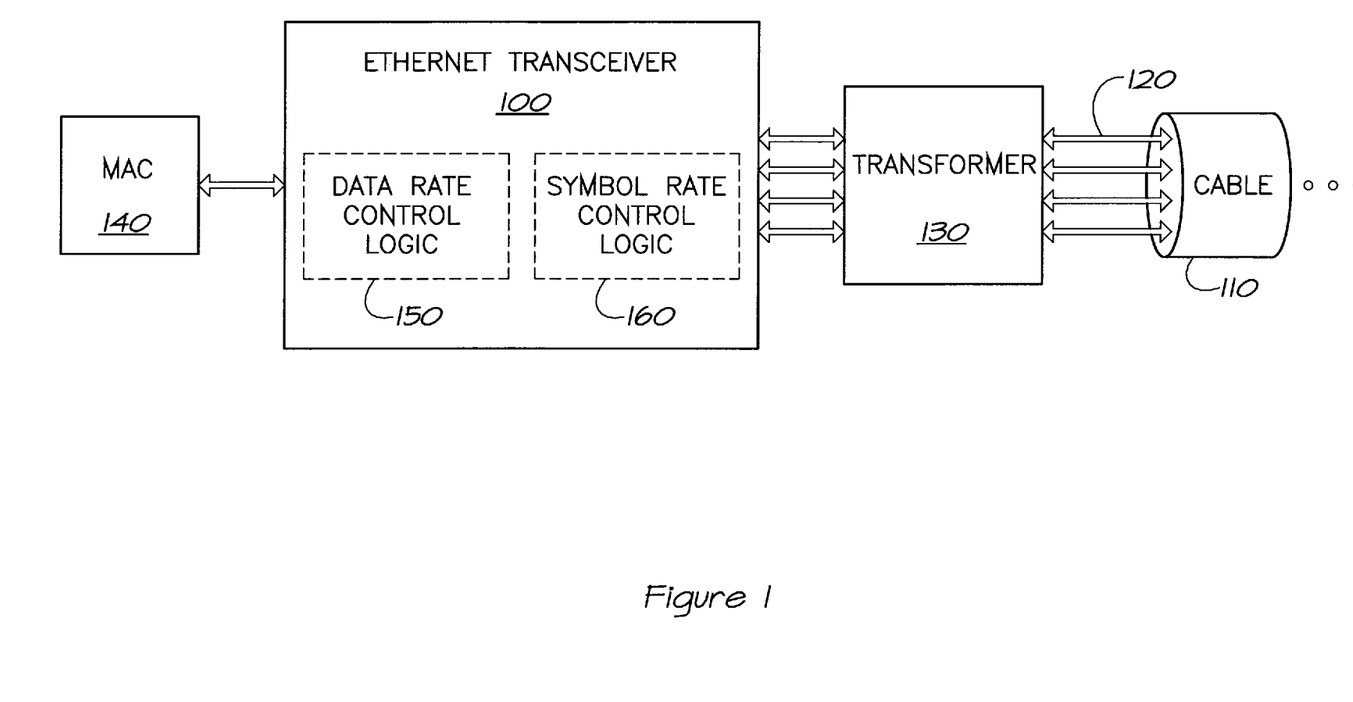
FIG. 1 is a block diagram of an embodiment of an Ethernet transceiver.

FIG. 1 illustrates an embodiment of an Ethernet transceiver 100 which may for example be a gigabit Ethernet transceiver. The transceiver 100 is connected to copper cabling 110 and enables physical layer signaling with a device (not shown) coupled to the transceiver 100 at the far end of the cable 110. The copper cable 110 includes one or more (e.g., 4 for CAT5 cabling) twisted-pair links 120 for carrying data between the transceiver 100 and the far end device. In one embodiment, a transformer 130 electromagnetically couples each twisted-pair link 120 to the transceiver 100. The transceiver 100 is also coupled to a MAC (media access controller) 140 which provides data link layer (i.e., layer-2) functionality. During transmit operations, the MAC 140 sends data frames to the transceiver 100. The transceiver 100 encodes the data frames into symbols and transmits the symbols over the cable 110 to the far end device. Conversely, the transceiver 100 receives data symbols from the far end device during receive operations and decodes the symbols. The decoded data is sent to the MAC 140 as frames for higher-layer processing.

In some applications, the copper cabling 110 includes enough twisted-pair links 120 of sufficient capacity to enable gigabit Ethernet speeds (i.e., 1000 Mbps or greater). For example, the cabling 110 may be a CAT-5 type cable or higher that includes at least four twisted-pair links 120 having a total capacity of 1000 Mbps or greater. In other applications, the copper cabling 110 does not include enough twisted-pair links 120 of sufficient capacity to enable gigabit Ethernet speeds. For example, the cabling 110 may be a CAT-3 type cable that includes less than four twisted-pair links 120. Conventional gigabit Ethernet transceivers reduce their data rate to 100 Mbps or 10 Mbps when connected to copper cabling having a total capacity less than 1000 Mbps. However, sub-gigabit capacity cabling often includes one or more twisted-pair links each having a capacity greater than that utilized by conventional transceivers when operating at 100 Mbps or 10 Mbps. For example, some types of CAT3 cabling comprise two to four twisted-pair links each having a capacity greater than 100 Mbps when the cable length is about 100 m or less. Thus, the cable has a total capacity far exceeding 100 Mbps, but less than 1000 Mbps. This additional bandwidth typically goes unutilized by conventional gigabit Ethernet transceivers when operated at a data rate of 100 Mbps or lower.

The Ethernet transceiver embodiments disclosed herein utilize this additional cabling capacity when operating at sub-gigabit data rates. The transceiver 100 is configurable to be connected to one or more twisted-pair links 120 of a cable 110. In one embodiment, the cable configuration is determined by the transceiver 100 using any appropriate detection method, e.g., auto-negotiation, cable diagnostics or link training. In another embodiment, the transceiver 100 is notified of the cable configuration via higher-layer signaling, e.g., via the MAC 140. In yet another embodiment, the transceiver is pre-configured for a particular number of twisted pair links 120.

Figure 2:
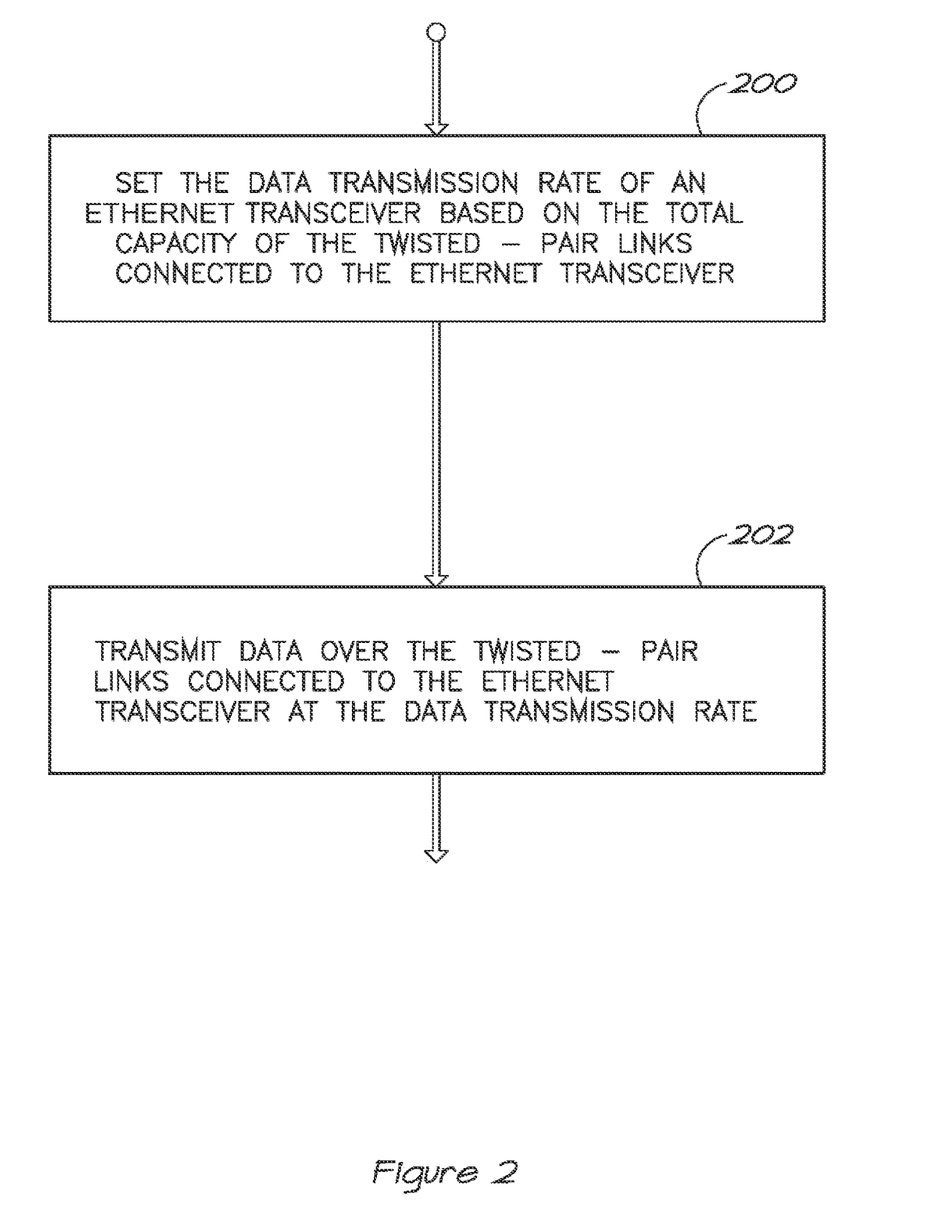
FIG. 2 is a logic flow diagram of an embodiment of processing logic for transmitting data by an Ethernet transceiver.

Data rate control logic 150 included in the Ethernet transceiver 100 sets the transceiver data transmission rate based on the total capacity of the twisted-pair links 120 connected to the transceiver 100, e.g., as illustrated by Step 200 of FIG. 2. This way, the data transmission rate is not arbitrarily set to 100 Mbps or lower when the cabling bandwidth limits transceiver performance to sub-gigabit Ethernet speeds. Instead, the data transmission rate of the transceiver 100 is a function of the total available cable capacity. This way, more of the cable bandwidth is utilized when the transceiver 100 operates in a sub-gigabit Ethernet mode. In one embodiment, each available twisted pair link 120 is set to a full-duplex transmission rate of 250 Mbps similar to the operation of a conventional Gigabit Ethernet Transceiver on a per twisted pair basis. Data is transmitted over the twisted-pair links 120 connected to the transceiver 100 at the data transmission rate set by the data rate control logic 150, e.g., as illustrated by Step 202 of FIG. 2.

In one embodiment, the transceiver 100 has a data rate of 1000 Mbps or greater when the cable 110 has at least four twisted-pair links 120 each having a capacity of about 250 Mbps. The transceiver data rate is decreased when the cable 110 has less than four twisted-pair links 120 because the total capacity of the cable 110 is below 1000 Mbps. However, transceiver performance is not arbitrarily decreased, e.g., to 100 Mbps or 10 Mbps as is conventionally done. Instead, the transceiver data rate corresponds to the number of twisted-pair links 120 connected to the transceiver 1100 and their respective capacity. In one embodiment, the data transmission rate of the transceiver 100 is set to approximately 250 Mbps when a single twisted-pair link 120 is connected to the transceiver 100 and is increased in approximately 250 Mbps increments for each additional twisted-pair link 120 connected to the transceiver 100. This way, the transceiver 100 operates at about 250 Mbps instead of 100 Mbps (or lower) when a single twisted-pair link 120 is connected to the transceiver 100, about 500 Mbps when two twisted-pair links 120 are connected to the transceiver 100 and about 750 Mbps when three twisted-pair links 120 are connected to the transceiver 100.

Figure 3:
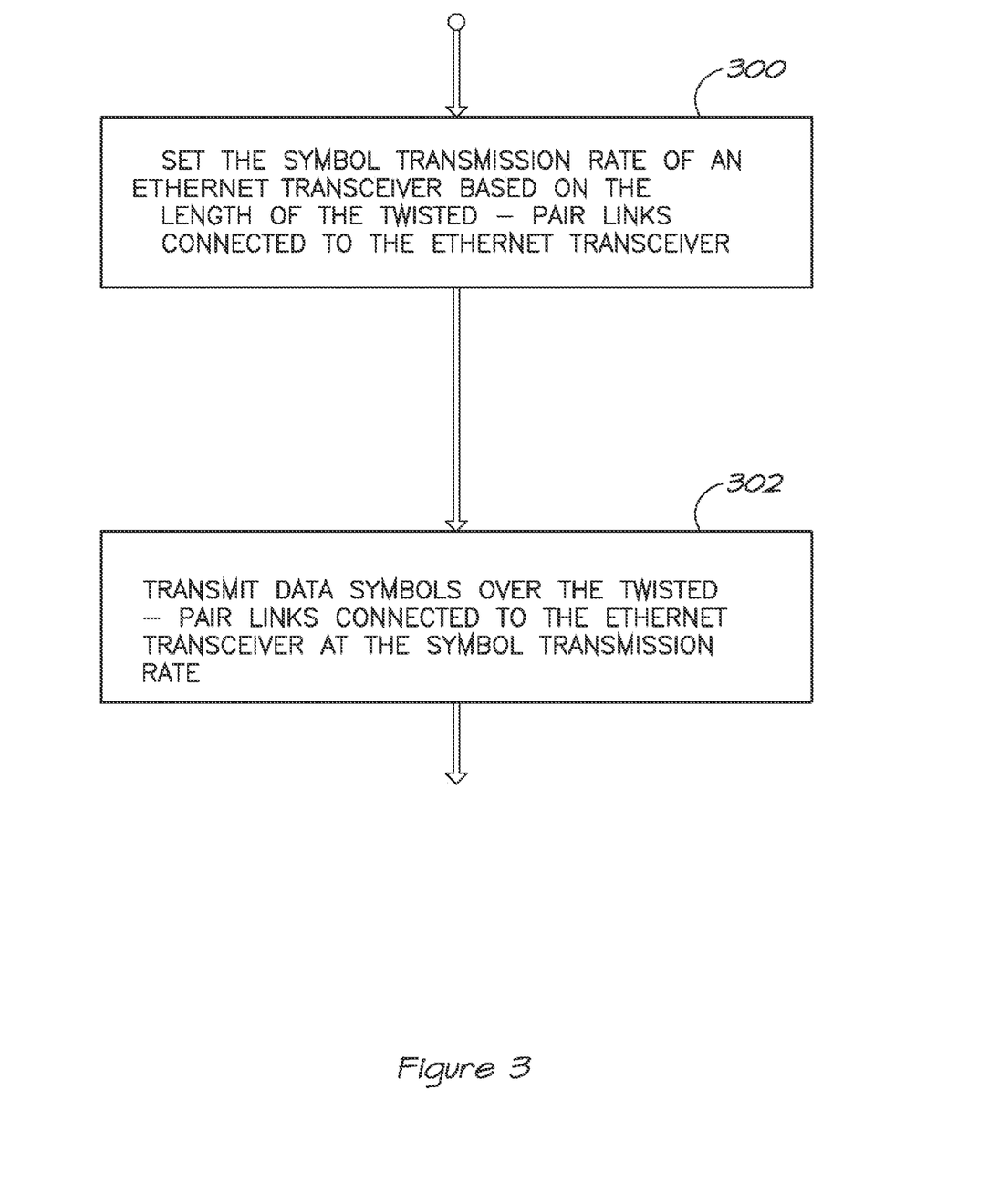
FIG. 3 is a logic flow diagram of another embodiment of processing logic for transmitting data by an Ethernet transceiver.

Alternatively, or in addition, the cable configuration information can be used to set the symbol transmission rate (i.e., Baud) of the transceiver 100. Symbol rate control logic 160 included in the transceiver 100 sets the transceiver Baud based on the lengths of the twisted-pair links 120 connected to the transceiver 100, e.g., as illustrated by Step 300 of FIG. 3. This, way the symbol transmission rate of the transceiver 100 can be adjusted accordingly to accommodate different length cables. In one embodiment, the symbol rate control logic 160 sets the symbol transmission rate to a default value of approximately 125 MBd ($1.25 \times 10^8$ Baud) when the cable 110 is about 100 m or less. The symbol rate is decreased when the cable 110 is longer. This way, cables of different length can be readily used without adversely affecting transceiver operation. Data symbols are transmitted over the twisted-pair links 120 connected to the transceiver 100 at the symbol transmission rate set by the symbol rate control logic 160, e.g., as illustrated by Step 302 of FIG. 3.

Figure 4:
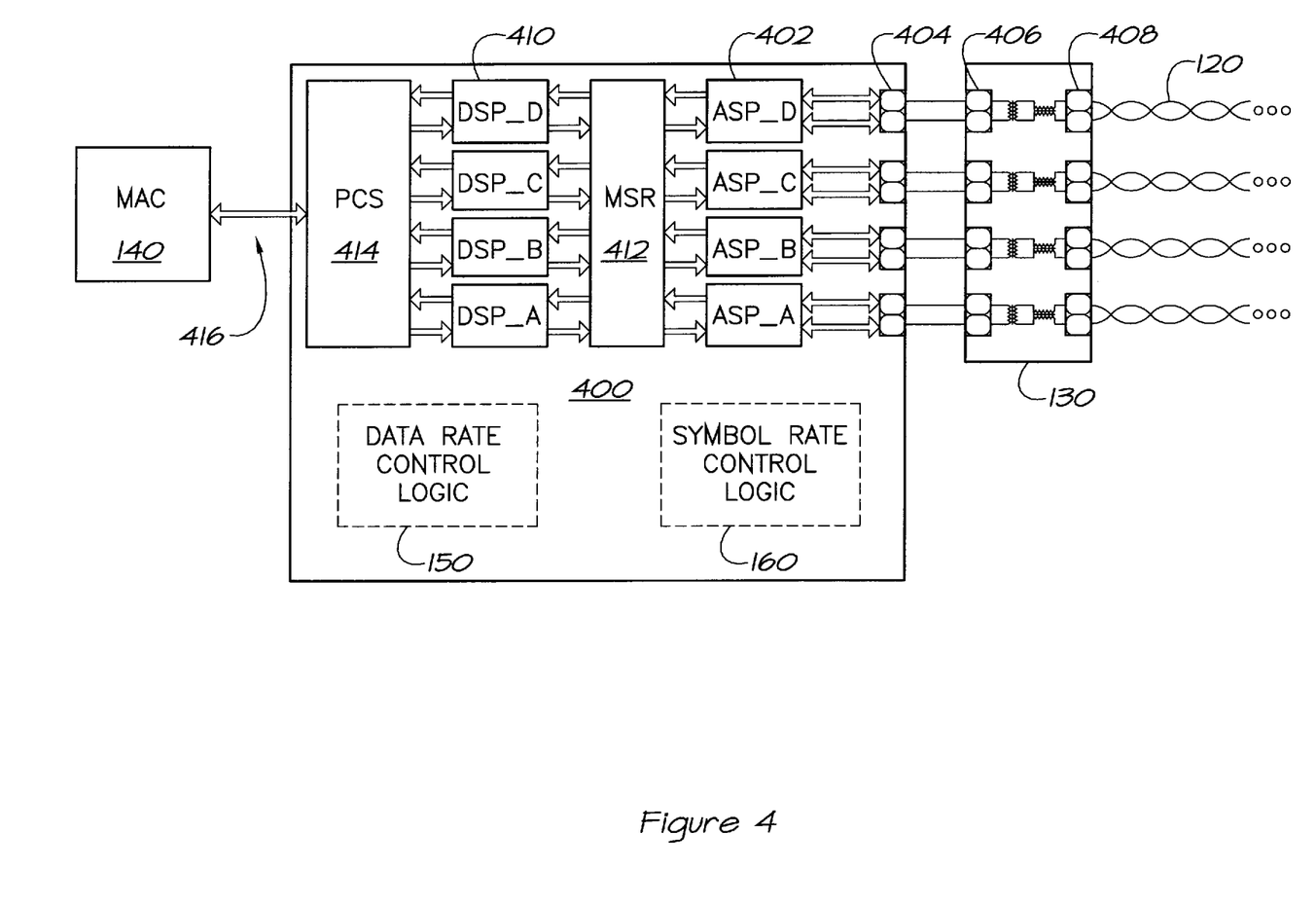
FIG. 4 is a block diagram of another embodiment of an Ethernet transceiver.

FIG. 4 illustrates an embodiment of the Ethernet transceiver 100. According to this embodiment, a PHY (physical interface transceiver) 400 controls physical layer signaling.

The PHY 400 includes an analog signal processor (ASP) 402 coupled to each physical layer I/O (input/output) 404 of the PHY 400. Each physical layer I/O 404 is also electromagnetically coupled to an I/O 406 of the transformer 130. The other end of the transformer 130 has I/Os 408 for connecting to one or more twisted-pair links 120 of the copper cabling 110. Each ASP 402 is coupled to a corresponding digital signal processor (DSP) 410 via a media signal router (MSR) 412 that functions as a multiplexer. As such, each DSP 410 can be multiplexed to any one of the ASPs 402 and vice-versa. Each ASP 402/DSP 410 combination forms one transmit and receive section of the PHY 400. In one embodiment, the PHY 400 includes four transmit and receive sections for supporting gigabit Ethernet speeds. The DSPs 410 perform functions like PMA (physical medium attachment) framing, octet synchronization and detection, and scrambling/descrambling. The ASPs 402 provide the physical signaling interface with the copper cabling. The ASPs 402 and DSPs 410 may include digital adaptive equalizers, encoders, decoders, echo cancellers, crosstalk cancellers, phase lock loop(s), line drivers, etc. and any accompanying support circuitry. The PHY 400 also includes PCS (physical coding sublayer) logic 414 for performing coding such as Trellis/Convolutional coding and auto-negotiation, including determining the cable capacity in one embodiment.

During operation, the PHY 400 receives layer-2 data frames from the MAC 140. The PHY 400 codes the frames into data symbols. In one embodiment, eight bits of data are encoded into four symbols. The encoded data are transmitted at a rate corresponding to the number of twisted-pair links 120 connected to the PHY 400. The data rate control logic 150 sets the data rate based on the total capacity of the twisted-pair links 120 connected to the PHY 400. In one embodiment, the data rate is set to 1000 Mbps or above when four twisted-pair links 120 are connected to the PHY 400. Accordingly, all four ASP 402/DSP 410 sections are active. The data rate is lowered to approximately 500 Mbps when two twisted-pair links 120 are connected to the PHY 400. Accordingly, two of the four ASP 402/DSP 410 sections are active. One of the ASP 402/DSP 410 sections transmits the encoded data at a rate of approximately 250 Mbps when a single twisted-pair link 120 is connected to the PHY 400.

The PHY 400 groups the symbols to be transmitted based on the number of twisted-pair links 120 connected to the PHY 400. Each group of symbols is then transmitted over a different one of the twisted-pair links 120. When four links 120 are present, each symbol is transmitted over a different one of the links 120 in parallel. Half of the symbols are transmitted in serial over a first one of the twisted-pair links 120 and the other half of the symbols transmitted in serial over a second one of the twisted-pair links 120 when two links 120 are connected to the PHY 400. All of the symbols are transmitted in serial over the same twisted-pair link 120 when a single link 120 is connected to the PHY 400. The symbol rate control logic 160 can similarly adjust the symbol rate based on the lengths of the twisted-pair links 120 connected to the PHY 400. This way, the cabling capacity is optimally utilized by the PHY 400 regardless of how many twisted-pair links 120 are connected to the PHY 400 and/or cable length.

In some applications such as an Ethernet switch SOC (system-on-chip), data rate adjustments made by the PHY 400 are also made at the MAC-PHY interface 416 to ensure proper system operation. In one embodiment, the PCS logic 414 sets the data transmission rate at the layer-2 interface 416 based on the PHY data rate. Accordingly, if the PHY data rate is set below 1000 Mbps, the MAC-PHY interface 416 also correspondingly runs below 1000 Mbps. This prevents data transmission errors between the MAC 140 and PHY 400. In other applications, the layer-2 interface 416 between the MAC 140 and PHY 400 is a standard interface such as an MII (Media Independent Interface) or GMII (gigabit MII) interface that does not support sub-gigabit data rates. Accordingly, data rate adjustments made by the PHY 400 cannot be equalized at the MAC-PHY interface 416 when the MAC-PHY interface data rate is fixed. In one embodiment, data transmitted between the MAC 140 and PHY 400 is buffered to account for any data rate differences that may exist at the MAC-PHY layer-2 interface 416.

Figure 5:
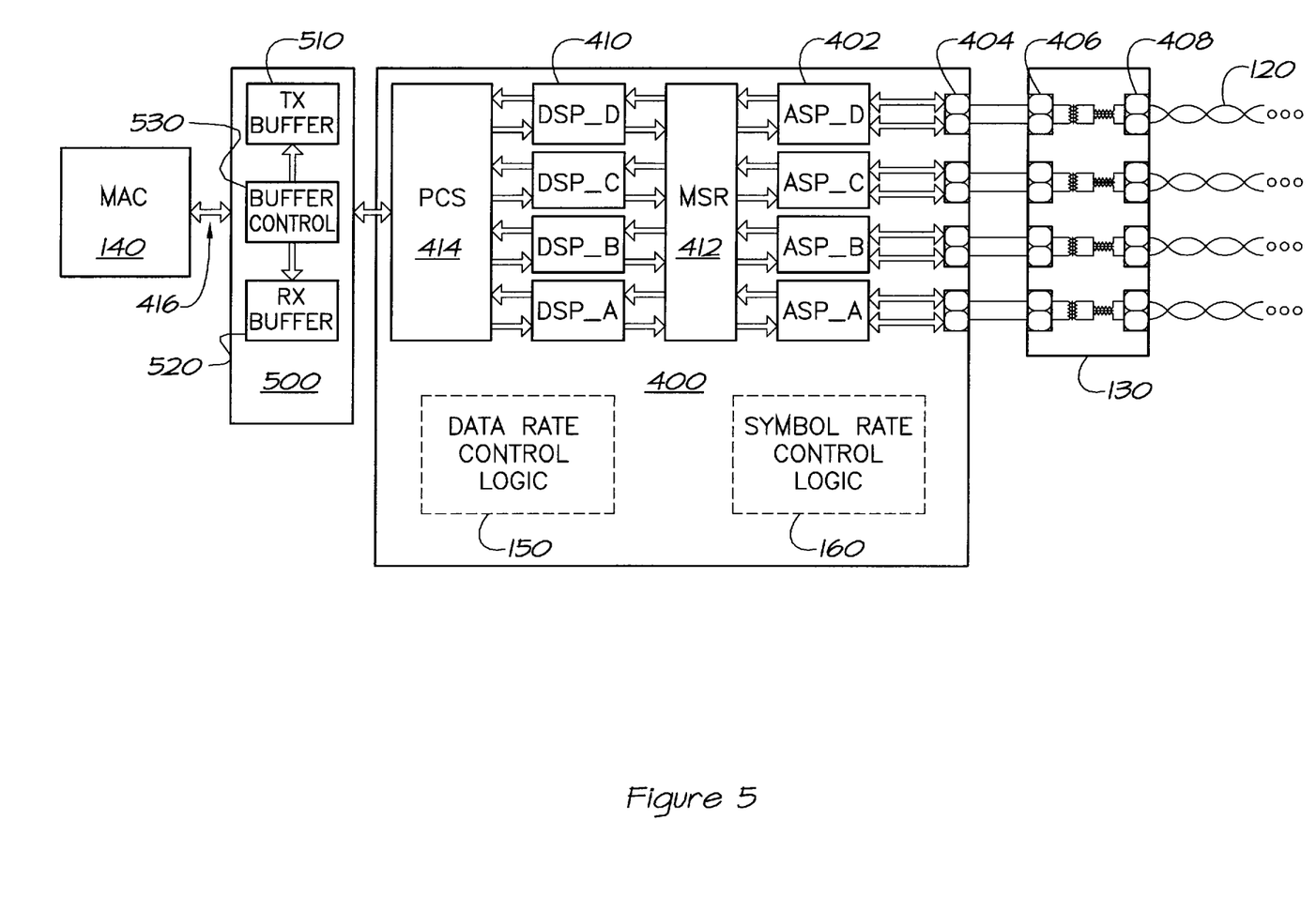
FIG. 5 is a block diagram of yet another embodiment of an Ethernet transceiver.

FIG. 5 illustrates an embodiment of the Ethernet transceiver 100 including buffer circuitry 500 coupled between the MAC 140 and PHY 400. The buffer circuitry 500 equalizes the data rate differences between the PHY 400 and the MAC-PHY layer-2 interface 416. In one embodiment, the data rate of the MAC-PHY layer-2 interface 416 is fixed at 1000 Mbps or greater. Depending on the type of copper cabling 110 coupled to the PHY 400, the PHY 400 may have a data rate below 1000 Mbps as described above. Accordingly, transmit and receive errors will occur at the MAC-PHY boundary 416 unless the data rate discrepancy is resolved. To this end, the buffer circuitry 500 includes a transmit buffer 510, a receive buffer 520 and buffer control logic 530. The buffer control logic 530 manages operation of the transmit and receiver buffers 510, 520 so that data underflow/overflow errors do not occur between the MAC 140 and PHY 400, making it appear to the MAC 140 as if the PHY 400 is running at 1000 Mbps even when it is not.

During receive operations, the PHY 400 processes symbols received from a far end device over the copper cabling 110. The PHY 400 decodes the symbols into data bits and sends the data to the MAC 140 in frames. The MAC-PHY interface 416 operates at a fixed data rate regardless of the PHY data rate. As such, enough of each frame received by the PHY 400 is stored in the receive buffer 520 before the transceiver 100 begins to transmit the frame data from the receive buffer 520 to the MAC 140. This way, a frame transmission to the MAC 140 is not disrupted by the receive buffer 520 running empty before the MAC 140 receives the entire frame. Otherwise, the MAC will detect a frame error when only part of the frame is received before the receive buffer 520 empty. The amount of frame data stored in the receive buffer 520 before the buffer control logic 530 allows data to flow from the receive buffer 520 to the MAC 140 depends on the data rate of the PHY 400. The slower the PHY 400 operates, the more frame data that is buffered before frame transmission to the MAC begins. Thus, the receive buffer 520 does not run empty before the entire frame is transmitted to the MAC 140. In one embodiment, a received frame is fully buffered before the transceiver 100 begins to transmit the frame to the MAC 140.

During transmit operations, the PHY 400 processes data frames sent by the MAC 140. The PHY 400 encodes the data frames into symbols and transmits the symbols to a far end device over the copper cabling 110. Again, the MAC-PHY interface 416 operates at a fixed data rate regardless of the PHY data rate. As such, the transceiver 100 stores data frames received from the MAC 140 in the transmit buffer 510. The buffered data is sent to the PHY 400 without delay where it is transmitted over the copper cabling 110. The buffer control logic 530 manages the flow of data into and out of the transmit buffer 510. When the PHY 400 operates slower than the MAC-PHY layer-2 interface 416, the transmit buffer 510 fills-up faster than the PHY 400 can process the frame data. For example, if the layer-2 interface 416 operates at 1000 Mbps and the PHY 400 operates at 500 Mbps, the transmit buffer 510 fills-up twice as fast as the PHY 400 can process data retrieved from the buffer 510.

The buffer control logic 530 monitors the transmit buffer capacity to prevent buffer overflow errors. When the capacity of the transmit buffer 510 falls below a threshold, the buffer control logic 530 indicates this condition to the MAC 140. In response, the MAC 140 does not send a new frame until instructed otherwise. In this operational mode, the MAC-PHY interface 416 is operated in half-duplex mode while the PHY 400 can still operate the media interface in full-duplex mode. In one embodiment, the transceiver 100 activates a collision signal (e.g., the COL collision detect signal) transmitted to the MAC 140 for indicating when the transmit buffer capacity falls below the threshold. The collision signal virtually indicates to the MAC 140 that the physical medium (i.e., cable 110) is busy. The collision signal is conventionally activated to avoid collisions during half-duplex operation when the PHY 400 is receiving symbols. In response, the MAC 140 defers sending new frames to the PHY 400 until the collision signal is deactivated. According to this embodiment, the PHY 400 does not actually operate in half-duplex mode. Instead, the PHY 400 continues to operate in full-duplex mode. Only the MAC-PHY interface 416 operates in half-duplex mode when the collision signal is activated. Accordingly, the MAC 'sees' a virtual PHY 400 operating at 1000 Mbps in half-duplex mode even though the PHY 400 actually operates in full-duplex mode. The PHY 400 continues to transmit data retrieved from the transmit buffer 510 while the MAC 140 waits for the collision signal to be deactivated before sending new frame data. Thus, the collision signal is used by the transceiver 100 as a backpressure mechanism for preventing transmit buffer 510 overflow instead of for avoiding collisions. In another embodiment, Flow-Control can be used by means of Pause-Frames. This allows the MAC 140 interface to continue full-duplex mode operation.

As the PHY 400 continues to transmit the buffered data in full-duplex mode, the transmit buffer 510 empties. Eventually, the storage capacity of the transmit buffer 510 increases above a certain threshold indicating that the buffer 510 now has sufficient capacity to begin receiving new frame data from the MAC 140. In response, the transceiver 100 deactivates the collision signal, indicating to the MAC 140 that new frames can be sent. To prevent frequent activation and deactivation of the collision signal, the transceiver 100 may use different thresholds for determining when to activate and deactivate the collision signal, respectively. Broadly, the buffer circuitry 500 enables the transceiver 100 to equalize data rate differences between the PHY 400 and MAC 140 when the MAC-PHY interface 416 does not support sub-gigabit data rates or is otherwise fixed.

According to one embodiment, the Ethernet transceiver 100 communicates its sub-gigabit operating states (e.g., 250 Mbps, 500 Mbps, etc.) to the far end device coupled to the other end of the copper cabling 110, e.g. when insufficient number of twisted pair links 120 are available caused by legacy or limited space cabling infrastructure. This way, the cabling capacity can be optimally utilized even when the capacity is less than 1000 Mbps. In one embodiment, the transceiver 100 communicates its transmission capability to the far end device by embedding the transmission information in one or more Next Pages exchanged with the far end device. Next Pages, extending the auto-negotiation feature, is a mechanism by which interconnected Ethernet devices can exchange information. Each Next Page includes code fields in which information such as the data and/or symbol rate capability of the transceiver 100 can be embedded and communicated to the far end device. The far end device can similarly communicate its transmission capability to the transceiver 100. The least common denominator of the data and/or symbol transmission rate can be implemented by the interconnected devices. If the far end device does not support Next Page exchanges or does not support the PHY 140 modes identified herein, the data transmission rate can be set to a default of 10baseT or 100baseT. As such, the enhanced PHY 140 is interoperable with far end devices which cannot accommodate non-standard Ethernet speeds such as 250 Mbps or 500 Mbps.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An Ethernet communication device configured to be connected to one or more twisted-pair links, the Ethernet communication device comprising a physical interface transceiver configured to:
   determine how many of the one or more twisted-pair links are connected to the Ethernet communication device;
   transmit data in a Gigabit Ethernet mode at 1000 Mbps or more when four twisted-pair links are connected to the Ethernet transceiver, and
   when less than four twisted pair links are connected to the Ethernet transceiver:
     transmit data at a data transmission rate of greater than 100 Mbps per available twisted-pair link when a far end device supports transmitting data at a data rate of greater than 100 Mbps per twisted-pair link connected to the Ethernet transceiver, or
     transmit data in one of a 100baseT mode or a 10baseT mode when the far end device does not supports transmitting data at a data rate of greater than 100 Mbps per twisted-pair link connected to the Ethernet transceiver.

2. The Ethernet communication device of claim 1, wherein the physical interface transceiver is configured to:
   set the data transmission rate to 250 Mbps when only one twisted-pair link is connected to the Ethernet communication device; and
   increase the data transmission rate by 250 Mbps for each additional twisted-pair link connected to the Ethernet communication device.

3. The Ethernet communication device of claim 1, wherein the physical interface transceiver is configured to:
   code a plurality of data bits into a plurality of symbols;
   group the symbols based on the number of twisted-pair links connected to the Ethernet communication device; and
   transmit each group of symbols over a different one of the twisted-pair links connected to the Ethernet communication device.

4. The Ethernet communication device of claim 3, wherein the physical interface transceiver is configured to:
   transmit each symbol over a different one of the twisted-pair links when four twisted-pair links are connected to the Ethernet communication device;
   transmit half of the symbols in serial over a first one of the twisted-pair links and the other half of the symbols in serial over a second one of the twisted-pair links when only two twisted-pair links are connected to the Ethernet communication device; and
   transmit all of the symbols in serial over the same twisted-pair link when only one twisted-pair link is connected to the Ethernet communication device.

5. The Ethernet communication device of claim 1, wherein the physical interface transceiver is configured to communicate with a media access controller at a fixed data rate regardless of how many twisted-pair links are connected to the Ethernet communication device.

6. The Ethernet communication device of claim 5, further comprising a buffer configured to buffer enough of a frame received by the physical interface transceiver before the physical interface transceiver begins to transmit the frame to the media access controller so that transmission of the frame to the media access controller is not disrupted before the media access controller receives the entire frame.

7. The Ethernet communication device of claim 6, wherein the entire frame is buffered before the physical interface transceiver begins to transmit the frame to the media access controller.

8. The Ethernet communication device of claim 5, further comprising a buffer configured to buffer data received from the media access controller, wherein the physical interface transceiver is configured to transmit the buffered data over the twisted-pair links connected to the Ethernet communication device and indicate to the media access controller when the capacity of the buffer falls below a threshold.

9. The Ethernet communication device of claim 8, wherein the physical interface transceiver is configured to activate a collision signal when the capacity of the buffer falls below the threshold.

10. The Ethernet communication device of claim 1, wherein the physical interface transceiver is configured to communicate the data transmission rate to the far end device.

* * * * *